C. S. LOCKWOOD.
SELF ADJUSTING CASING FOR ROLLER BEARINGS.
APPLICATION FILED MAR. 26, 1909.

958,143.

Patented May 17, 1910.

Witnesses
L. Lee.
J. W. Greenbaum

Inventor.
Charles S. Lockwood
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

SELF-ADJUSTING CASING FOR ROLLER-BEARINGS.

958,143.  Specification of Letters Patent.  Patented May 17, 1910.

Application filed March 26, 1909. Serial No. 485,971.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Self-Adjusting Casings for Roller-Bearings, fully described and represented in the following specification and the accompanying drawings, forming a part of the same.

The present invention relates to roller bearings in which two sets of tapering rolls are fitted to a double conical hub so that their sloping outer surfaces may be embraced by two opposed conical seats which can be suitably adjusted toward one another to compensate for wear and take up lost motion of the rolls.

In the present invention, the seats are formed upon separate rings and made with spherical exterior and fitted to a spherical casing so that the bearing is wholly self-adjusting to various positions of the shaft within a certain range.

The exterior of the casing is preferably made cylindrical so that such bearings may be fitted interchangeably into a cylindrical socket of a given size. This enables the bearings to be made in standard sizes as regular articles of manufacture for supplying manufacturers of automobiles and other machines, and greatly facilitates the renewal of the parts when necessary.

The invention will be understood by reference to the annexed drawing, in which—

Figure 1:
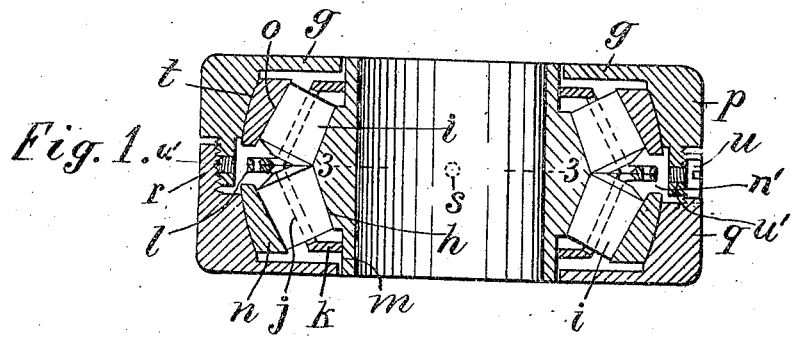
Figure 2:
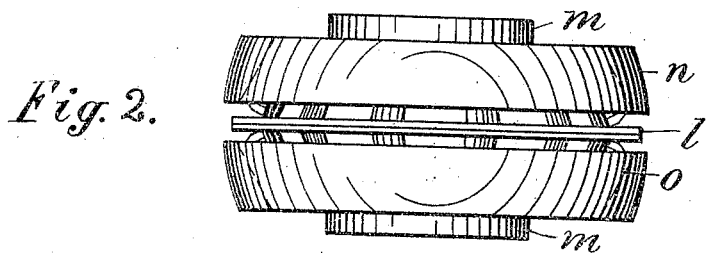
Figure 3:
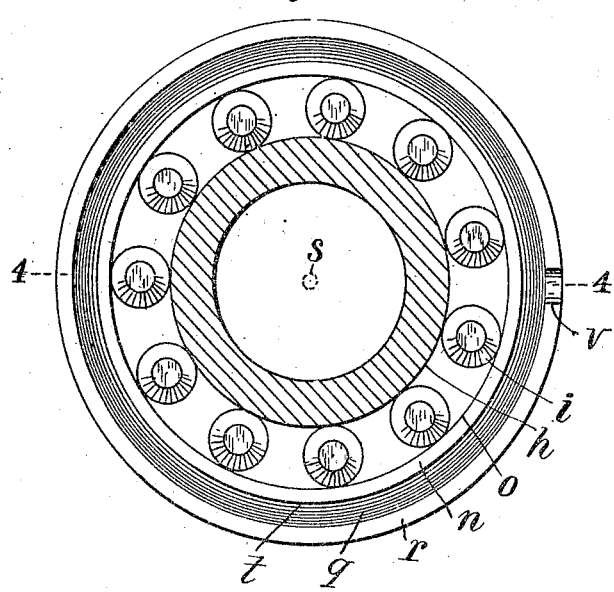
Figure 4:
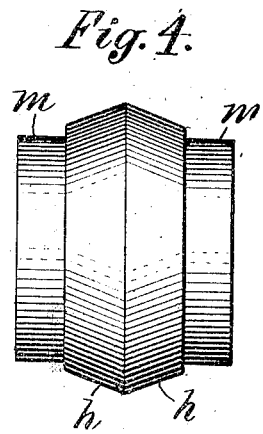

Figure 1 is a cross section on line 4—4 in Fig. 3; Fig. 2 is an elevation of the parts with the casing removed; Fig. 3 is an end view of one-half of the casing with the rolls therein and the hub in section on line 3—3 in Fig. 1; and Fig. 4 is an elevation of the hub shown in Fig. 1.

The hub is shown with double conical seats $h$ adapted to be secured upon a shaft or axle in any suitable manner, and two sets of tapering rolls $i$ are shown fitted to such seats with their larger ends in contact and held in place by a cage. The cage is formed with arms $j$, marginal rings $k$ and with central joint-rings $l$. The rings $k$ rotate upon cylindrical seats $m$ upon the ends of the hub, and the joint-rings $l$ are secured together by rivets, after applying them to the opposite ends of the hub. The rolls can then be applied to the spaces between the arms $j$. Two bearing-rings $n$ are shown fitted to embrace the outer sides of the two sets of rolls and formed with sloping seats $o$ to fit the inclination of the rolls. The exteriors of the two bearing-rings $n$ are curved spherically, being concentric with the center of the bearing indicated by the dotted circle $s$ in Figs. 1 and 3. The casing is divided transversely into two parts $p$ and $q$ connected by threaded flanges $r$, and the parts are formed at opposite sides of its transverse diameter with concentric spherical seats $t$ which form a spherical joint with the bearing-rings; and can be adjusted snugly to the same by screwing together the threaded collars $r$. The rings $n$ are separated by an interspace $n'$ in which the joint-flanges $l$ of the cage can revolve, room for such space resulting from the flaring position of the adjacent ends of the rolls $i$. The contiguous corners of the rolls are beveled to run against one another. The outer flange $r$ is provided, as shown in Fig. 3, with a notch $v$, and a series of tap-holes $u'$ is formed in the inner flange so that a screw can be inserted through the notch into any of the said holes and the head of the screw be wholly inclosed in the notch.

The screw and the series of tap-holes furnish a means of locking the parts of the casing together when suitably adjusted and without any projection from the exterior cylindrical body of the casing, which would prevent it from fitting into a cylindrical socket of corresponding size. This construction also permits the parts to be adjusted to compensate for wear and thus avoids lost motion in the bearing.

The hub is highest at the middle, while the seats $o$ in the rings $n$ and the spherical seats $t$ in the casing taper toward the ends of the bearing, which prevents the hub from shifting endwise in either direction within the casing, and the bearing thus resists end thrust as well as the lateral strain of the load. The two parts of the casing are shown provided at their outer ends with flanges $g$ which extend to the hub and serve as dust-guards, and also as oil-retainers to keep oil in the lower part of the bearing.

The use of separate rings $n$ with tapering seats $o$ within the same to embrace the rolls, and a spherical exterior, not only makes the parts adjustable to the rolls but self-adjusting within the casing to various angular positions of the shaft within limits. It will be observed that the rings n are not coupled together in any manner but are held in the proper relation to the rolls i by mere engagement with the concave spherical bore of the casing. This is rendered possible by the opposition of the concave bore to the sloping outer surfaces of the rolls, as the concave bore tends to press the rings n toward one another, while the load upon the rolls tends to force them outwardly and to carry the rings with them. The engagement of the rings with the spherical bore resists the outward thrust exerted upon the rings and thus holds them in their working position.

Having thus set forth the nature of the invention what is claimed herein is:

1. As a new article of manufacture, a self-contained and self-adjusting roller-bearing having a hub with the double conical seats h and two sets of tapering rolls i fitted to such seats with their larger ends adjacent, a casing having a spherical bore, and two rings n fitted to the said bore at opposite sides of its diameter and provided with tapering seats o embracing the outer sides of the two sets of rolls.

2. As a new article of manufacture, a self-contained and self-adjusting roller-bearing having a hub with the double conical seats h and two sets of tapering rolls i fitted to such seats, a cage fitted to revolve about the hub with the rolls to guide the same, a casing having a spherical bore, and two rings n fitted to the said bore at opposite sides of its transverse diameter with interspace n' between the rings for the periphery of the cage, the casing being divided and provided with means for adjusting toward one another the spherical surfaces which bear upon the rings n.

3. As a new article of manufacture, a roller-bearing having a hub with double conical seats h and two sets of tapering rolls fitted to such seats, a casing provided with a spherical bore and two rings n fitted to the said bore at opposite sides of its diameter and provided with tapering seats o embracing the outer sides of the two sets of rolls, the casing being divided and the parts connected by screw-threads, the outer part having the notch v therein and the inner part having a series of tap-holes to coincide separately with such notch, and a screw adapted to engage the notch and any one of the said holes and wholly inclosed by such notch, whereby the parts of the casing may be adjusted and its cylindrical exterior fitted directly to a cylindrical socket.

4. As a new article of manufacture, a self-contained and self-adjusting roller-bearing having a hub with the double conical seats h and two sets of tapering rolls i fitted to such seats with their larger ends adjacent, a cylindrical casing having a spherical bore, and two rings n fitted to the said bore at opposite sides of its diameter and provided with tapering seats o fitted respectively to the outer sides of the two sets of rolls, the casing being divided and the parts connected by screw-threads, the outer part r having the notch v therein and the inner part having a series of tap-holes, and a screw adapted to engage the notch and any one of the said holes and wholly inclosed by such notch.

5. A self-contained and self-adjusting roller-bearing having a cylindrical periphery adapted to removably fit a cylindrical socket, the bearing having a hub with the double conical seats h and two sets of tapering rolls fitted to such seats, two rings n with tapering bore embracing the outsides of the rolls and having their exteriors curved concentrically and spherically, and the cylindrical casing of the bearing having a spherical bore arranged and operated to hold the tapering rings in their working position, and divided transversely in two parts for application to the rings, and the casing having at both ends of the rolls integral dust-guards extended toward the hub, the two parts of the casing being connected adjustably together.

In testimony whereof I have hereunto set my hand in the presence of two subscribing witnesses.

CHARLES S. LOCKWOOD.

Witnesses:
ALFRED WARD,
H. E. SAUL.